US011291196B2

(12) United States Patent
Ouellette

(10) Patent No.: US 11,291,196 B2
(45) Date of Patent: Apr. 5, 2022

(54) OUTRIGGER KIT FOR FISHING

(71) Applicant: Michael Ouellette, Auburn, ME (US)

(72) Inventor: Michael Ouellette, Auburn, ME (US)

( * ) Notice: Subject to any disclaimer, the term of this patent is extended or adjusted under 35 U.S.C. 154(b) by 585 days.

(21) Appl. No.: 15/998,281

(22) Filed: Jul. 30, 2018

(65) Prior Publication Data

US 2020/0029542 A1 Jan. 30, 2020

(51) Int. Cl.
*A01K 91/08* (2006.01)
*A01K 87/02* (2006.01)
*A01K 97/08* (2006.01)
*A01K 87/04* (2006.01)

(52) U.S. Cl.
CPC ............ *A01K 91/08* (2013.01); *A01K 87/025* (2013.01); *A01K 87/04* (2013.01); *A01K 97/08* (2013.01)

(58) Field of Classification Search
CPC ...... A01K 91/08; A01K 87/025; A01K 87/04; A01K 97/08
See application file for complete search history.

(56) References Cited

U.S. PATENT DOCUMENTS

| 4,114,829 | A | * | 9/1978 | Boehler | ................. | B65H 57/06 |
| | | | | | | 24/131 C |
| 4,632,050 | A | * | 12/1986 | Rupp | .................... | A01K 91/08 |
| | | | | | | 114/255 |
| 6,557,481 | B1 | * | 5/2003 | Schweid | ................. | B63B 17/00 |
| | | | | | | 114/255 |
| 7,941,964 | B2 | * | 5/2011 | Stanton | .................. | A01K 97/10 |
| | | | | | | 43/21.2 |
| 8,656,632 | B1 | * | 2/2014 | Mercier | ................. | A01K 91/18 |
| | | | | | | 43/27.4 |
| 2017/0071178 | A1 | * | 3/2017 | Serocki | ................... | B63B 35/14 |

FOREIGN PATENT DOCUMENTS

FR 2573956 A1 * 6/1986 ............. A01K 91/08

* cited by examiner

*Primary Examiner* — Kathleen I Alker
(74) *Attorney, Agent, or Firm* — Charles F. Seyboldt

(57) ABSTRACT

This invention provides an outrigger assembly for fishing that can be quickly deployed from a portable bag about 1 meter long into a fully rigged outrigger in a selected length of 4 meters, 5 meters or 6 meters. Variable length is obtained by adding sections of telescoping pole. Quick deployment is obtained by using detachable line guides that are radially (or side) threadable in conjunction with a separate preassembled outrigger line loop for each deployed length. Different length outrigger line loop assemblies are color coded for quick identification. Stowed length and volume of the collapsed telescoping pole is minimized by the use of outrigger line guides that are removable from the outrigger pole. Threading and unthreading of an outrigger line loop without opening the loop is enabled by the radially threadable line guides. The invention also provides an outrigger holder having two sockets, one for the outrigger and one for a fishing pole.

1 Claim, 14 Drawing Sheets

THREADING

UNTHREADING

OUTRIGGER KIT FOR FISHING

BACKGROUND OF THE PRESENT INVENTION

Summary of the Prior Art

This invention relates to an outrigger kit for fishing, and more particularly to an outrigger kit for fishing wherein the outrigger kit includes a bare telescoping pole, a pole holder to adapt a single pole holding receptacle to hold two poles, line guides that friction fit the outrigger pole where the line guides can be threaded from the side, a loop of outrigger line pre-assembled at a fixed and appropriate length between two pulleys where the pulleys include carabiner-like clip attachment means for easy attachment to and detachment from the pole and pole holder, and a portable case for storing all the parts. The outrigger kit for fishing can be provided in a form that allows multiple length configurations with the addition of telescoping pole lengths and corresponding line-loop/pulley assemblies. The pole holder has two sockets, one to hold the outrigger pole, and the other to hold a fishing pole, notched to hold fly rod and reel assembly.

The typical outrigger fishing activity involves an outrigger pole with fixed line guides that cannot be threaded from the side. A length of outrigger line is threaded to run through the line guides, from the top of the rod holder to the tip of the outrigger pole, then the ends of the length of outrigger line are tied or otherwise connected so the outrigger line forms a continuous a loop. The outrigger pole is placed in a holder on the fishing boat. The fisherman then pays out a desired length of fishing line from a fishing pole and reel, and releasably attaches the fishing line to the outrigger line using a spring loaded clamp that resembles an alligator clip. This attachment is initially located near the base of the outrigger pole, after which the attachment point of the fishing line to the outrigger line can be located anyplace along the length of outrigger by pulling the loop of outrigger line, similar to the operation of a pulley clothesline. It is common to arrange more than one fishing line along the length of the outrigger.

The telescoping pole of this invention is known and common in general.

Likewise, fishing line guides are known, although they are usually fixed to the fishing (or outrigger) pole with thread and epoxy. The use of removable line guides is known, being disclosed in at least one online fisherman's internet forum, in an article that teaches an adaptation of fishing with a long pole.

A line guide with a ring in contact with a fishing pole is disclosed in U.S. Pat. No. 4,080,748 to Ohmura. This line guide is removable, even though it is preferred to be glued in place on a fishing pole, See also "Fuji Type TA," "Fuji Type IM," "Fuji Type KM," "Fuji Type KWM" and "Fuji Type TM" telescopic rod guides.

Line guides that must be through or axial threaded are most common, but side or radial threadable fishing line guides are also known, being disclosed in numerous issued United States patents such as US U.S. Pat. No. 754,094 to Roth and U.S. Pat. No. 2,319,462 to Kruse.

Fishing rod holders are also known and varied, including rod holders adapted to hold more than one rod.

SUMMARY OF THE PRESENT INVENTION

The present invention relates to an outrigger kit for fishing where the outrigger can be taken from a stored, compact (kit) configuration to a deployed configuration quickly and easily. The outrigger kit for fishing is further adaptable to varying lengths by the use of a fewer or greater number of telescoping tube segments with corresponding length pre-assembled continuous loops of outrigger line.

It is an objective of the present invention to provide an outrigger than can be deployed in one of several lengths, without having to create any length of continuous loop of outrigger line.

Another objective of the present invention is to provide an outrigger that can be stowed in a package of minimal practical length. Detachable line guides allow the shortest (fully nested) storage of the telescoping pole.

Another object of the present invention is to provide an outrigger kit that includes all of the parts necessary to move from fishing without an outrigger, to fishing with an outrigger.

Another object of the present invention is to use (be made from, as much as practical) and work with common fishing hardware, so as to not require modifications to the fishing boat or fishing tackle.

Another objective of the present invention is to provide pole holding hardware so that the fisherman's boat does not need to be modified to add holding facilities for an outrigger pole.

Another objective of the present invention is to provide a carrying case arranged to organize the stowed parts of the outrigger kit for fishing.

In summary, and in accordance with the above discussion, the foregoing objectives are achieved in the following embodiments.

1. A method of fishing using an outrigger, comprising the steps of:

providing a telescoping pole with a large end and a small end, having an eye at the small end; and attaching one or more detachable outrigger line guides to the telescoping pole;

where the line guides are radially threadable.

2. A method of fishing using an outrigger as described in paragraph 1, further comprising the steps of:

providing an outrigger line loop assembly comprising a first pulley having a first snap clip, a second pulley having a second snap clip, and a continuous loop of cord running around both first and second pulleys, where the continuous loop of cord has a going length and a returning length, where the going and returning lengths are approximately the same as the extended length of the telescoping pole;

attaching the first snap clip to the eye at the smaller end of the telescoping pole; and threading a portion of the returning length of the continuous loop of cord through each radially threadable line guide.

3. A method of fishing using an outrigger as described in paragraph 2, further comprising the steps of:

removing the returning length of continuous loop of cord from each radially threadable line guide;

detaching the outrigger line loop assembly from the telescoping pole;

extending the length of the telescoping pole by adding a first additional telescoping pole section;

providing a second outrigger line loop assembly adapted to the length of the telescoping pole including the first additional telescoping pole section.

4. A method of fishing using an outrigger as described in paragraph 2, further comprising the step of providing a pole holder having first and second pole holding receptacles.

5. A method of fishing using an outrigger as described in paragraph 4, further comprising the steps of:

inserting the large end of the telescoping pole into the first pole holding receptacles; and attaching the second snap clip to the first pole holding receptacle.

6. A kit for fishing with an outrigger comprising:

a telescoping pole having a large end and a small end, with an eye at the small end; and one or more detachable outrigger line guides;

where the line guides are radially threadable.

7. A kit for fishing with an outrigger as described in paragraph 6, further comprising:

an outrigger line loop assembly comprising a first pulley having a first snap clip, a second pulley having a second snap clip, and a continuous loop of cord running around both first and second pulleys, where the continuous loop of cord has a going length and a returning length, where the going and returning lengths are approximately the same as the extended length of the telescoping pole.

8. A kit for fishing with an outrigger as described in paragraph 7, further comprising:

a first additional telescoping pole section;

a second outrigger line loop assembly adapted to the length of the telescoping pole including the first additional telescoping pole section.

9. A kit for fishing with an outrigger as described in paragraph 8, further comprising:

a second additional telescoping pole section;

a third outrigger line loop assembly adapted to the length of the telescoping pole including both the first and second additional telescoping pole sections.

10. A kit for fishing with an outrigger as described in paragraph 7, further comprising:

a rod holder that is adapted to insert into a rod holder receptacle on a fishing boat; where the rod holder has first and second pole holding receptacles.

11. A kit for fishing with an outrigger as described in paragraph 10, where the first and second pole holding receptacles are independently adjustable.

12. A kit for fishing with an outrigger as described in paragraph 11, further comprising:

a carrying case that holds the telescoping pole; the first and second additional telescoping pole sections; the first, second, and third outrigger line loop assemblies; and the rod holder having first and second pole holding receptacles.

13. A rod holder that is adapted to insert into a rod holder receptacle on a fishing boat; where the rod holder has two independently adjustable pole holding receptacles.

DESCRIPTION OF THE PREFERRED EMBODIMENTS OF THE PRESENT INVENTION

Figure 1:
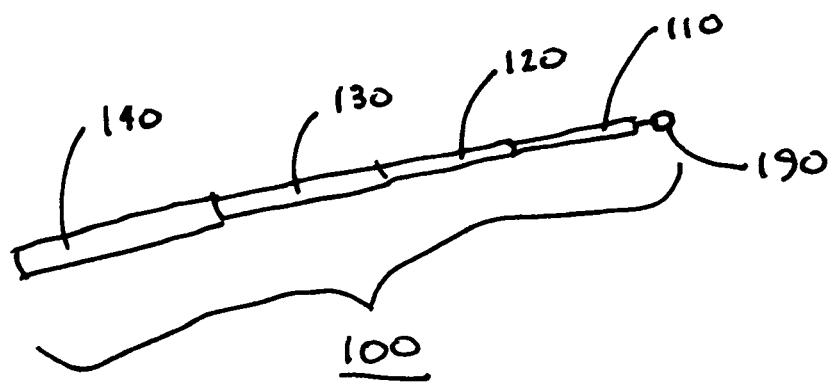
FIG. 1 is a side view of a telescoping outrigger pole.

FIG. 1 is a side view of an outrigger pole.

Telescoping pole 100 is made of multiple sections of hollow tapered tube. Telescoping pole section 110 has a smaller diameter and can nest within telescoping pole section 120; telescoping pole section 120 has a smaller diameter and can nest within telescoping pole section 130; and telescoping pole sections 140 is likewise progressively larger diameter than pole section 130, so that all four sections can nest within the length of largest diameter section 140.

Telescoping pole sections can be made from a fiberglass and resin material, or from a carbon fiber and resin material, or from any other material that is suitable for a lightweight, flexible, telescoping and nesting pole. The preferred embodiment uses carbon fiber and resin. The dimensions of the telescoping pole assembly can vary, but the preferred embodiment uses pole section lengths of about one meter.

Figure 18:
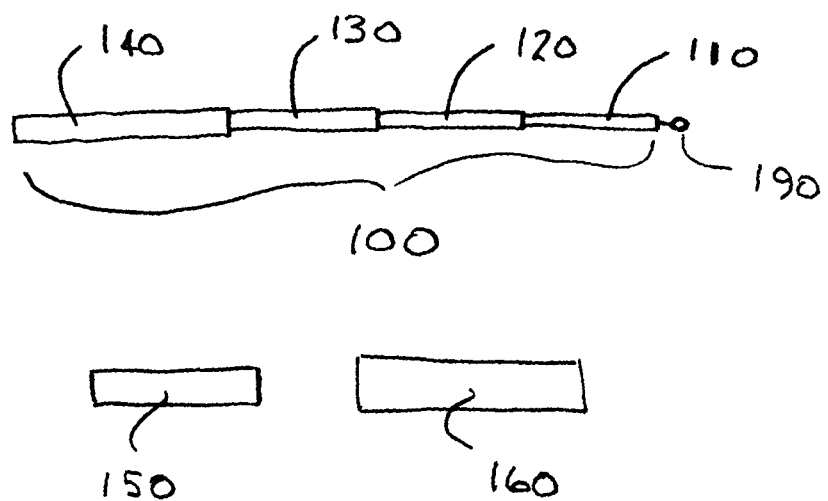
FIG. 18 is a side view of a telescoping outrigger pole and additional telescoping pole sections.
Figure 20:
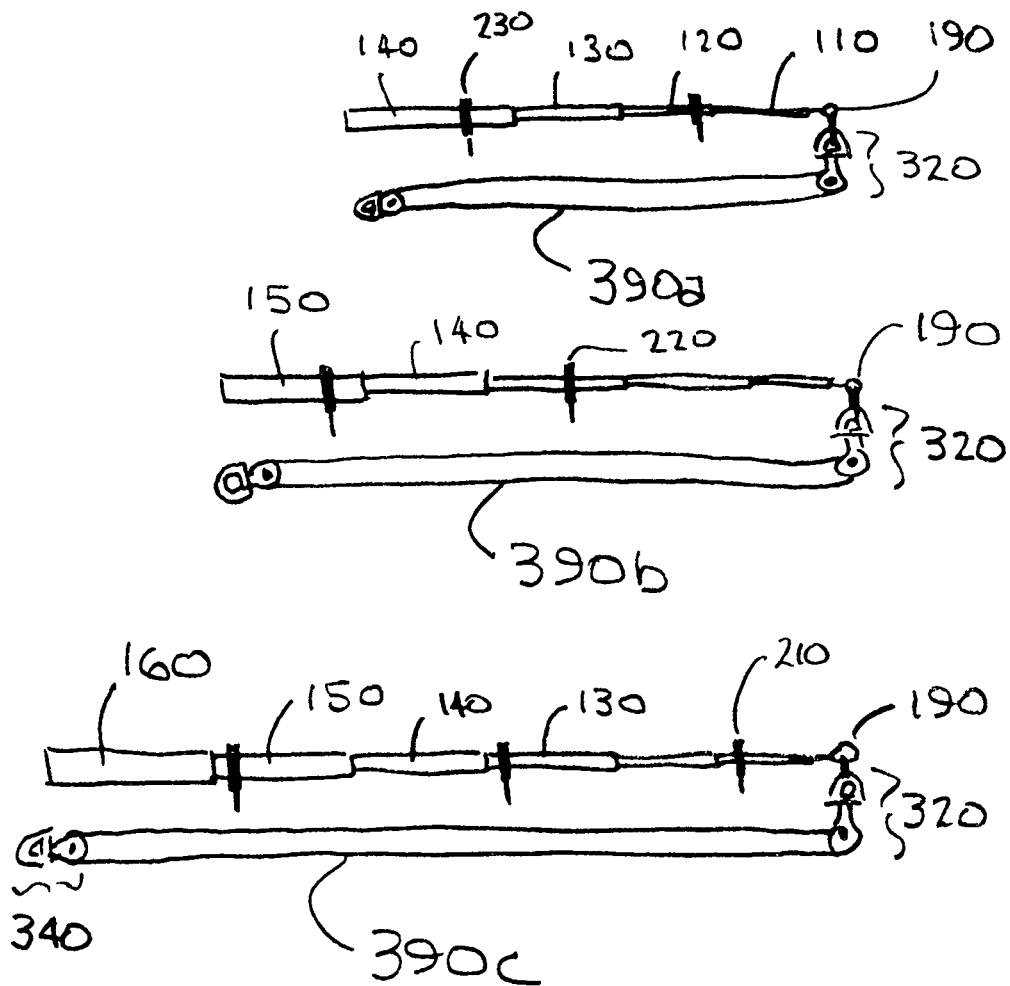
FIG. 20 is a side view of three outrigger poles, each with outrigger line guides and an outrigger line loop assembly.

The outrigger kit preferably includes two or more additional and larger diameter telescoping pole sections, pole sections 150 and 160 illustrated in FIG. 18, so that the extended length of the deployed outrigger pole can vary. In the preferred embodiment, the kit is provided with parts to assemble outrigger poles of approximately 4 meters (12 feet), 5 meters (15 feet) or 6 meters (18 feet) length. The 4 meter deployed length is obtained with a telescoping pole having five sections. The 5 meter deployed length is obtained by using two additional sections of telescoping pole; the 6 meter deployed length is obtained by using three additional sections of telescoping pole. FIG. 20 shows three assembled outrigger poles of different lengths with line loop assemblies also having different lengths.

Butt or shank end of the larger diameter sections of telescoping pole 100 (that is, section 140 and larger diameter sections 150 and 160s) can be reinforced to accommodate the side loading associated with the shank or butt end of the outrigger pole being held in a fairly rigid tubular socket.

In the preferred embodiment, the outside diameter of the larger end of the largest diameter telescoping pole section is about 42 millimeters (1.65 inches), and the diameter of the end that eye 190 is attached to is about 5.8 millimeters (0.23 inches).

The length of the longest (also largest diameter) segment of the preferred telescoping pole is about 940 millimeters. Smaller diameter (tapered) segments are progressively shorter to facilitate nesting, with the smallest diameter segment—the segment that includes eye 190—being about 760 millimeters (30 inches) long.

The small end of telescoping pole section 110 has an attached eye 190, which functions to hold one end of an outrigger line loop assembly. Eye 190 is desired to be rigid and not deformed by the forces involved in fishing with the outrigger. In the preferred embodiment, eye 190 is made of corrosion resistant steel wire, and is fixed to the pole. Eye 190 uses wire of about 1.3 millimeter (0.050 inch) diameter, formed into a loop having an outside diameter of about 9.7 millimeters (0.38 inch).

Figure 2:
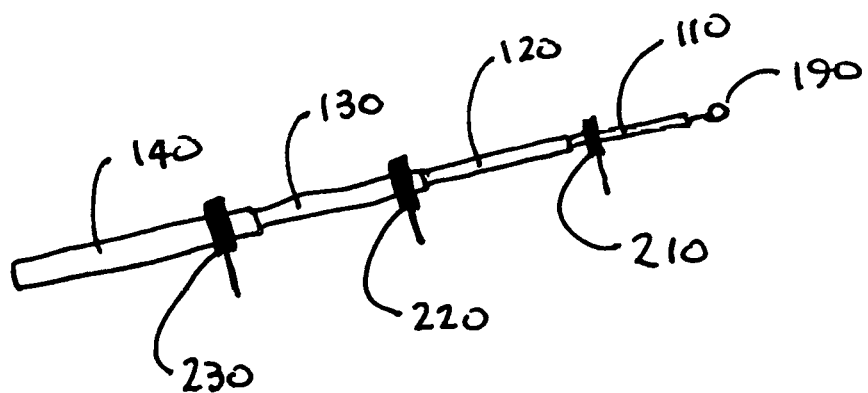
FIG. 2 is a side view of a telescoping outrigger pole with removable line guides.

FIG. 2 is a side view of a telescoping outrigger pole with removable line guide assemblies.

Detachable outrigger line guide assemblies 210, 220, and 230 are friction or compression fit to the outside diameter of telescoping pole 100.

The number and placement of line guide assemblies is variable but generally speaking, it is advantageous to have support for the outrigger line about each meter.

In the preferred embodiment, the 4 meter deployed length configuration uses two line guides, the 5 meter deployed length configuration uses three line guides, and the 6 meter deployed length configuration uses four line guides.

Figure 3:
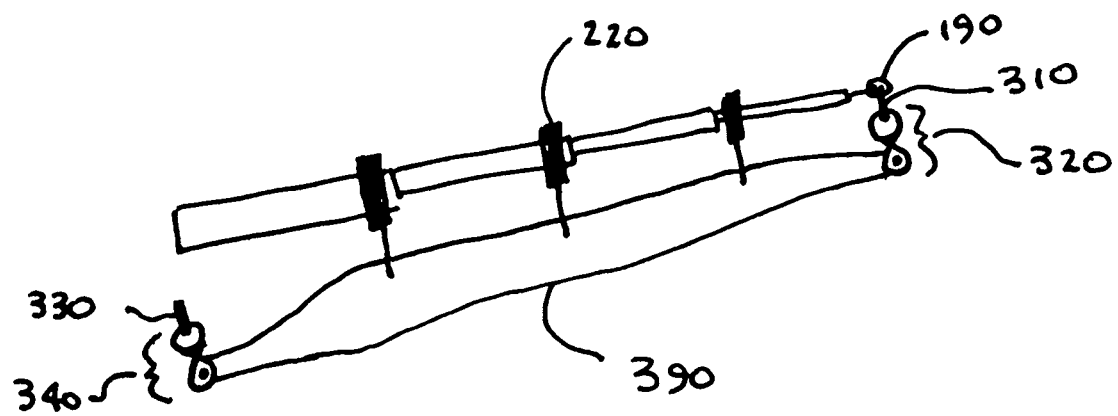
FIG. 3 is a side view of an outrigger pole, outrigger line guides, and a loop of outrigger line.

FIG. 3 is a side view of an outrigger pole, outrigger line guide assemblies, and a continuous loop of outrigger line.

The present invention uses a pre-assembled arrangement of two pulleys and a continuous loop of outrigger line. Pulley assembly 320 may be attached to eye 190 using a separate clip 310, or clip 310 may be an integral part of pulley assembly 320. Likewise, clip 330 may be separate from, or may be an integral part of pulley assembly 340. If clips 310 and 330 are parts separate from the pulleys, then each clip will preferably have two openable ends, one end of each clip being used to attach to a pulley, the other end of the first clip used to attach pulley 320 to eye 190 at the end of the outrigger pole and the second clip being used to attach the other pulley to an outrigger pole holder.

Figure 5:
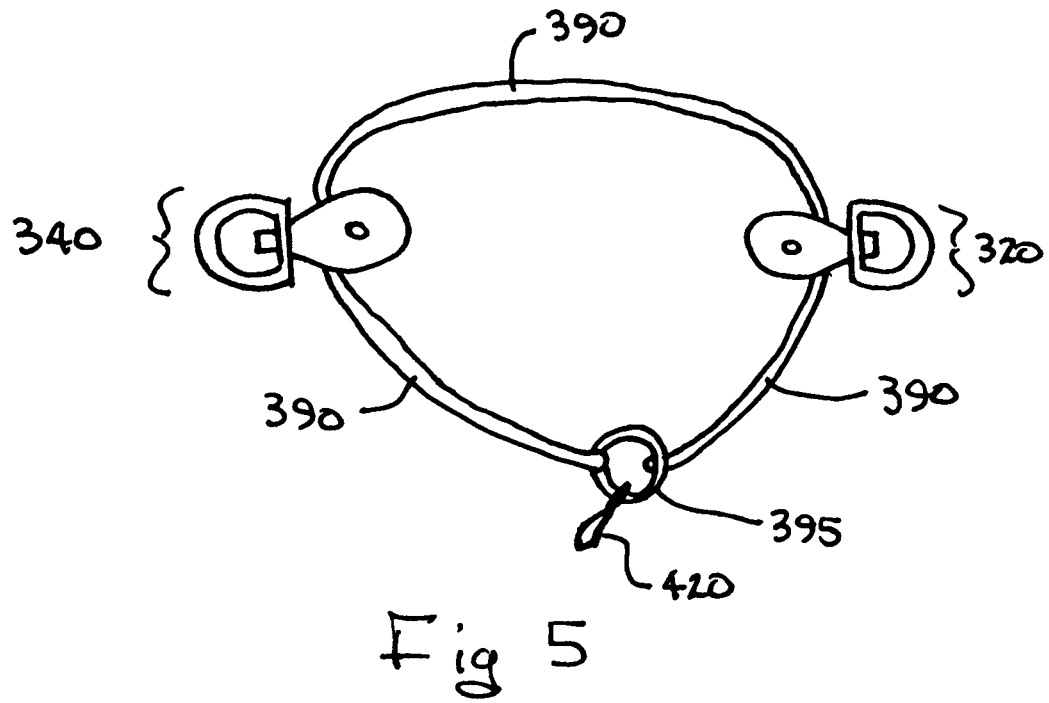
FIG. 5 is a view of a continuous loop of outrigger line running through two pulleys.
Figure 19:
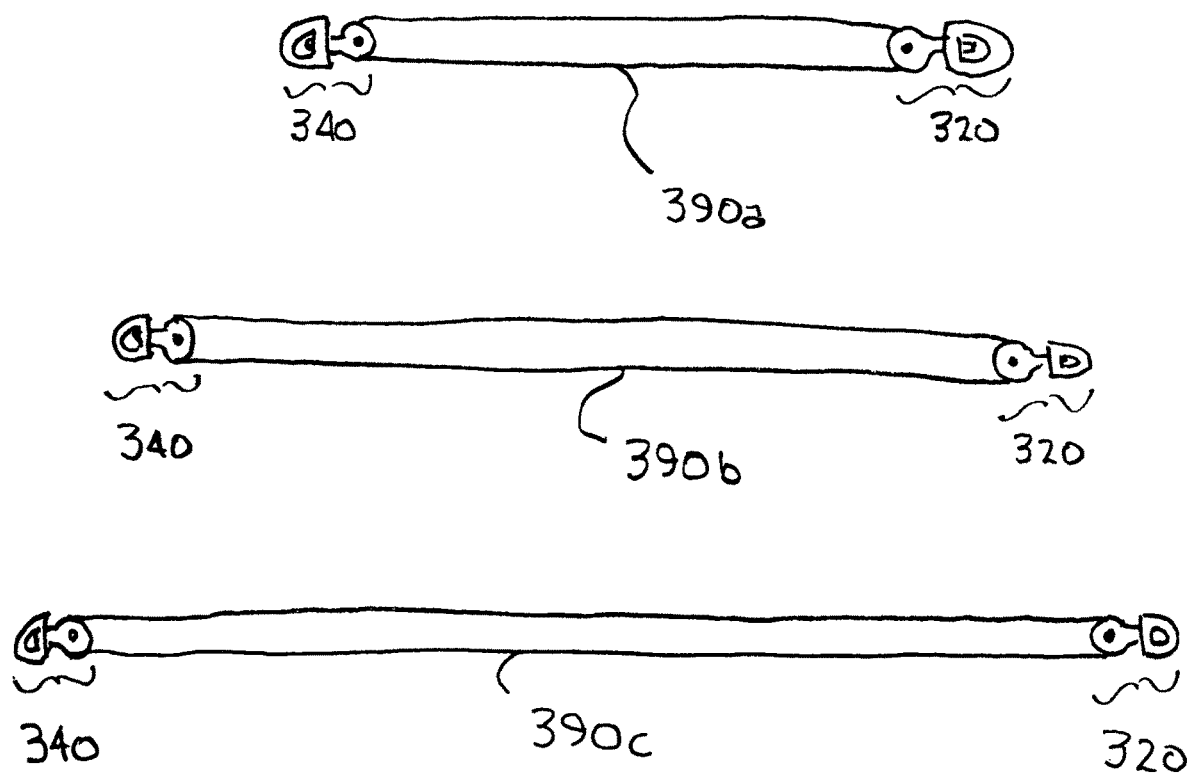
FIG. 19 is a view of three outrigger line loop assemblies, being length-only variations of the continuous loop of outrigger line running through two pulleys as illustrated in FIG. 5.

Continuous loop of outrigger line 390 is preassembled to run through pulley assemblies 320 and 340. The length of loop 390 is approximately the length of the extended outrigger pole 100. In the preferred embodiment, three preassembled lengths of loop 390 are provided, with each loop being run through two pulley assemblies. FIG. 19 is a view of three outrigger line loop assemblies, being length-only variations of the continuous loop of outrigger line running through two pulleys as illustrated in FIG. 5. One loop/pulley assembly is provided for each length of about 4 meters (12 feet) line loop 390a, about 5 meters (15 feet) line loop 390b, and about 6 meters (18 feet) line loop 390c. The fisherman does not have to thread a length of line through pulleys, then connect the length of line into a loop as part of rigging the outrigger for fishing, as the outrigger is changed between the available extended lengths. FIG. 20 is a side view of three outrigger poles, each with outrigger line guides and an outrigger line loop assembly.

Figure 4:
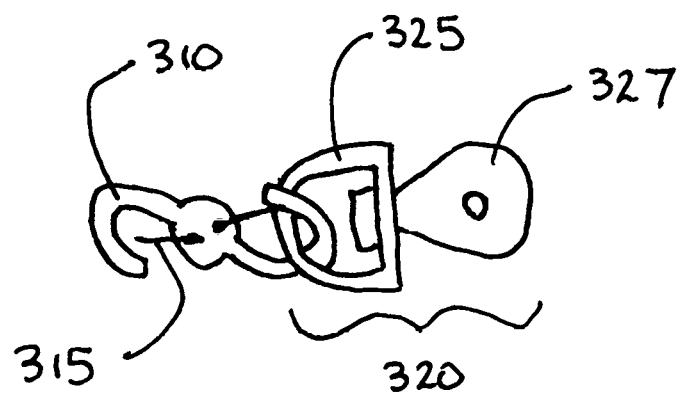
FIG. 4 is a side view of a pulley/clip combination.

FIG. 4 is a side view of a pulley/clip combination.

A common name for clip 310 is "S carabiner." The preferred item for clip 310 is marketed as a "stainless steel micro S-biner." Clip 310 has two opposing ends, and two spring loaded catches 315 for retention. In the preferred embodiment, one end of two-ended clip 310 is attached to pulley/swivel assembly 320. The other end of clip 310 will be used to attach to eye 190 at the small end of the outrigger pole, as illustrated in FIG. 3.

Pulley/swivel assembly 320 includes hard loop 325 (used to attach to clip 310) and pulley 327, with hard loop 325 and pulley 327 being attached to allow the two parts to swivel or rotate about an axis that is perpendicular to the pulley rotation axis.

Pulley/swivel assemblies 320 and 340 are selected to match the diameter of outrigger line 390. Further, pulley diameter is selected being relatively small in order to minimize the weight of hardware that is hung from pole eye 190.

Similarly, clips 310 and 330 are selected to match the size of eye 190, minimize weight, yet be large enough that manipulation and assembly of the clip 310 to eye 190 requires a minimum of care in alignment, and allows some freedom of movement after assembly.

The swivel function of pulley/swivel assemblies 120 and 340 facilitates arranging loop of outrigger cord 390 so that the loop does not cross itself—that is to say, so loop 390 appears as a simple loop as illustrated in FIG. 3. As stowed when not in use, loop 390 will inevitably develop crossovers to itself. The presence of the swivel function allow rigging the outrigger to occur in the order of clipping pulley assembly 320 to pole eye 190, followed by twisting the loop of downrigger line 390 so that all cross-overs are removed In the preferred embodiment, clip 330 is the same part as clip 310, and pulley/swivel assembly 340 is the same part as pulley/swivel assembly 320. All of these parts are preferably common hardware store items, in order to facilitate replacement and repair should a part be lost, damaged, or wear out.

FIG. 5 is a view of a continuous loop of outrigger line running through two pulleys.

A length of outrigger line is threaded between pulley assemblies 320 and 340, then made into continuous loop of outrigger line 390.

Metal ring 395 is part of continuous loop 390, and serves to limit the motion of continuous loop 390 through pulley assemblies 320 and 340. The limited motion of continuous loop 390 is beneficial, by preventing fishing line release 420 from being drawn through pole-end pulley assembly 320.

The fisherman will typically attach a fishing line to fishing line release 420 while the fishing line release is close to pulley assembly 340. After this step, continuous loop 390 can be pulled until metal ring 395 is felt to meet pulley assembly 320. The mechanical stop between metal ring 395 and pulley assembly 320 prevents inadvertent separation of the fishing line release 420 from continuous loop 390.

Figure 6:
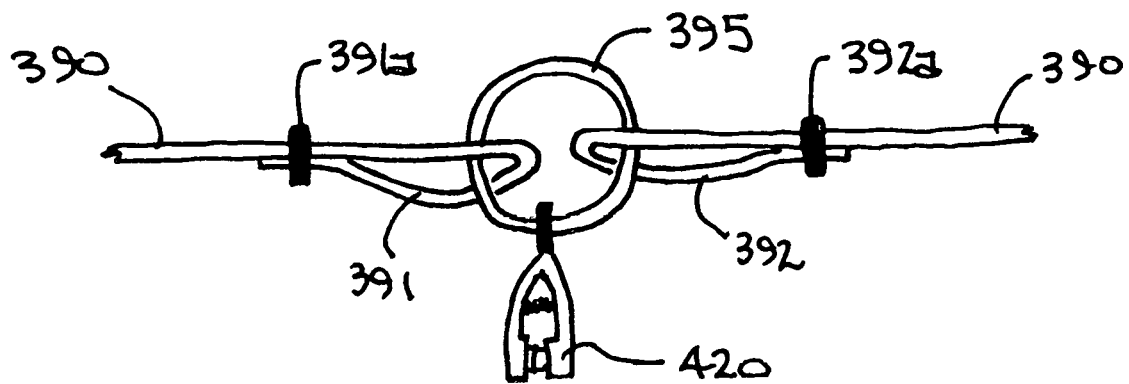
FIG. 6 is a view of part of a continuous loop of outrigger line.

FIG. 6 is a view of part of a continuous loop of outrigger line.

In the preferred embodiment, length of outrigger cord is floating and waterproof braided line formed into continuous loop 390 by making crimped loop ends 391 and 392, each crimped loop end being retained with a stainless steel crimp noted as 391a and 392a in the figure. A 5 mm (3/16 inch) size crimp is used, but any suitable size crimp or method of making a loop end could also be used in the practice of the claimed invention. For example, splicing the braided line ends, or knotting them.

To complete continuous loop 390, crimped loop ends 391 and 392 are connected to each other by metal ring 395. In the preferred embodiment, metal ring 395 is a keyring, which allows loop ends 391 and 392 to be prepared independently of metal ring 395, and also allows attachment of line release 420. An alternative embodiment would use a solid metal ring, with loop ends 391 and 392 being assembled in conjunction with or while connected to metal ring 395.

In alternative embodiments, continuous loop 390 could be completed by any convenient means such as a single knot or splicing, and entirely skipping the use of metal ring 395.

Fishing line release 420 is any suitable and commercially available line release, made for the purpose of outrigger fishing. In the preferred embodiment, fishing line release 420 has a through hole that connects it to metal ring 395.

Figure 7:
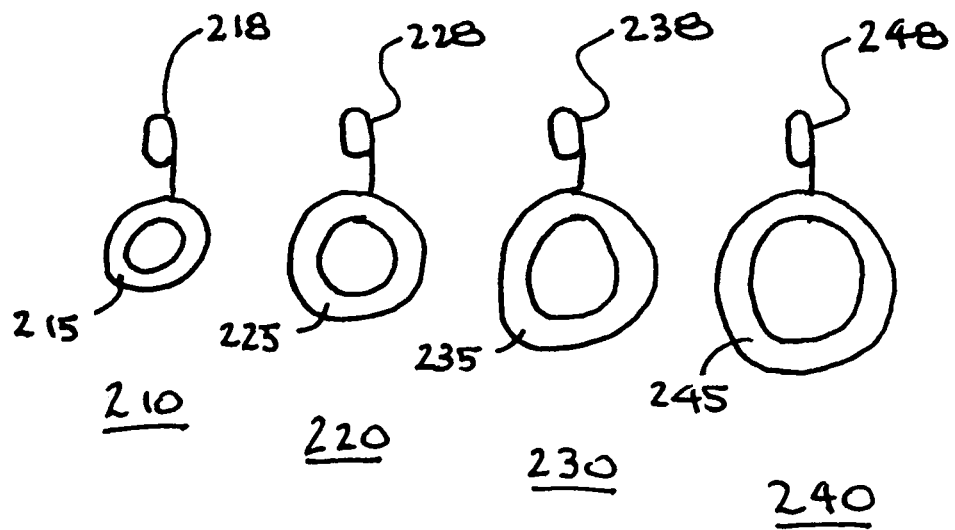
FIG. 7 is an end view of a set of four detachable, radial threadable outrigger line guide assemblies.

FIG. 7 is an end view of a set of four detachable, radial threadable outrigger line guide assemblies.

Line guide assemblies 210, 220, 230 and 240 are similar, having flexible cylindrical elastomeric pole gripping parts 215, 225, 235, and 245 respectively, and outrigger line guide parts 218, 228, 238 and 248 respectively. The inside diameters of the elastomeric pole gripping parts varies from smallest on 215 to largest on 245. This variation in inside diameter results in separated axial placement on telescoping pole 100, as the line guide assemblies are slid over and come to grip telescoping pole 100, as illustrated in FIG. 2 and FIG. 3.

Figure 8:
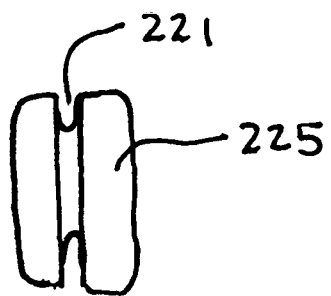
FIG. 8 is a side view of a flexible pole gripping portion of a detachable outrigger line guide assembly.

FIG. 8 is a side view of a flexible pole gripping portion of a detachable outrigger line guide assembly.

Flexible elastomeric pole gripping part 225 of outrigger line guide assembly 220 has annular groove 221, with a depth and width being approximately the same as the diameter of the wire used to form outrigger line guide part 228.

Axial length and radial thickness of flexible elastomeric pole gripping part 225 (as well as parts 215, 235, and 245) must be sufficient to provide gripping friction greater than the forces that tend to displace them, such as from the outrigger line loop being stressed by fishing activity. The preferred axial length is about 20 millimeters (three-quarters of an inch), and the preferred radial thickness is about 8 millimeters (three eighths of an inch).

Larger and smaller diameter flexible elastomeric pole gripping parts (215, 235, and 245) each have a structure that is similar to flexible elastomeric pole gripping part 225. That is, each has an annular groove, and each has similar axial length and radial thickness, with the variation being the inside and outside diameters.

In the preferred embodiment, the flexible elastomeric pole gripping parts are standard bulkhead grommets made of thermoplastic rubber, sometimes referred to as an open or hole grommet. The exact dimensions are relatively unimportant, as the bent metal line guide parts are adapted to fit the standard bulkhead grommets.

Figure 9:
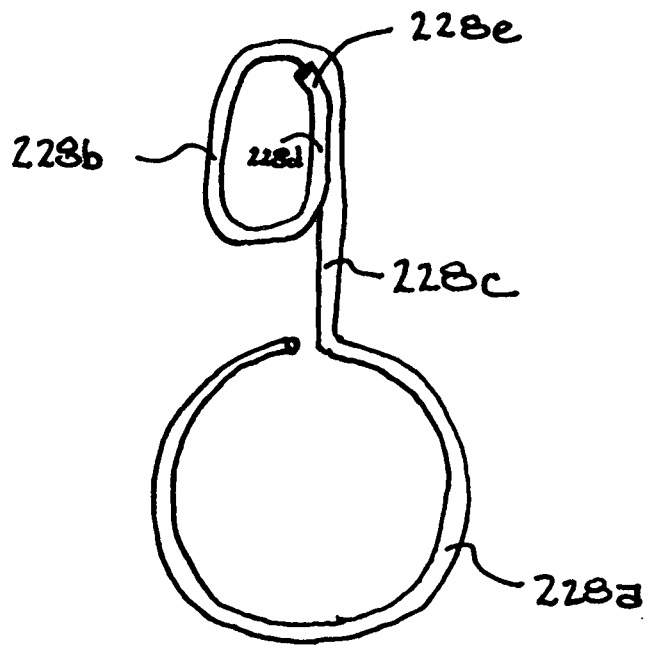
FIG. 9 is an oblique, nominally front view of a radially threadable outrigger line guide.

FIG. 9 is an oblique, nominally front view of a radially threadable outrigger line guide.

Outrigger line guide part 228 is preferably made from a single piece of corrosion resistant wire of 2.4 millimeter (0.095 inch) diameter, bent to a configuration having two loops. Circular loop 228a is retained by annular groove 221 in elastomeric pole gripping part 225. Elongated loop 228b is radially threadable, and will be used to guide continuous loop 390 of outrigger line. Circular loop 228a and elongated loop 228b are connected by straight section 228c, with straight section 228c also forming part of elongated loop 228b.

Figure 10:
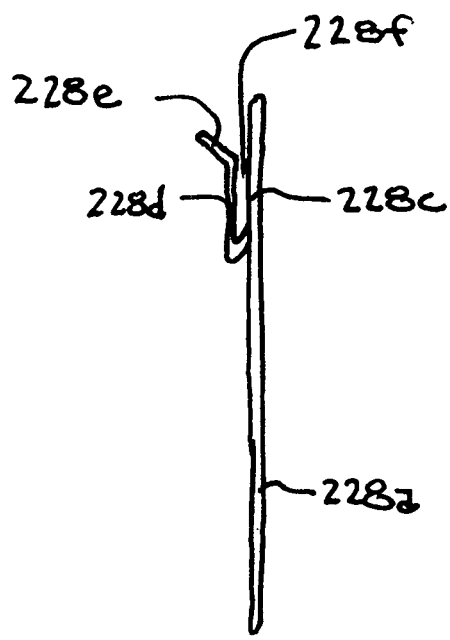
FIG. 10 is a side view of a radially threadable outrigger line guide.

FIG. 10 is a side view of a radially threadable outrigger line guide.

Elongated loop 228b includes straight section 228c, an upper bend of preferably constant radius through 180 degrees with the bend radius forming the width of elongated loop 228b, another straight section, a lower bend through 180 degrees, (overlapping) straight section 228d that overlaps part of straight section 228c, and angled section 228e. Overlapping straight section 228d is preferred to have about 2 millimeter (0.080 inch) separation from straight section 228c. Angled section 228e is a transition from two lengths of the same wire being separated by 2 millimeters (228c and 228d in the side view) and overlapping (in a front view), to separated by more then the thickness of the outrigger cord in the side view. In other words, the preferred opening at gap 228f, the distance between angled section 228e and straight section 228c, will be greater then the diameter of the outrigger line used to make continuous loop 390. The end of the piece of wire making angled section 228e is at approximately the same elevation as the beginning of the upper bend of the elongated loop.

In the preferred embodiment, elongated loop 228b has inside dimensions of about 17.7 millimeters by 8.7 millimeters. The separation between circular loop 228a and elongated loop 228b is about 9.9 millimeters, measured from the outside of the respective loops.

The other outrigger line guide parts (218, 238, and 248) have a structure that is similar to outrigger line guide part 228, with the diameter of the circular loops being adapted to fit flexible pole gripping parts 215, 235, and 245.

Figure 11:
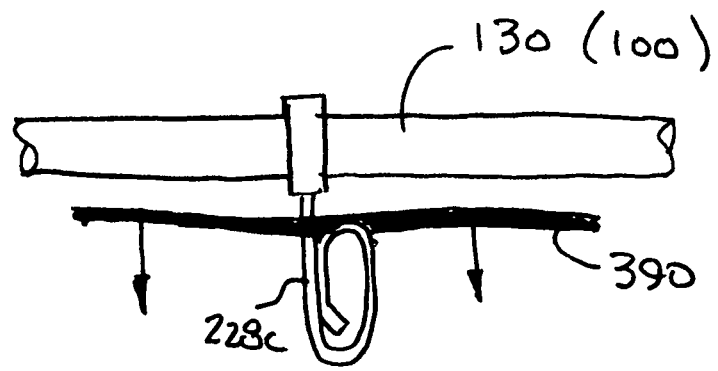
FIG. 11 is a view of the method of threading and unthreading a section of continuous loop of outrigger line through a radially threadable outrigger line guide.
Figure 11:
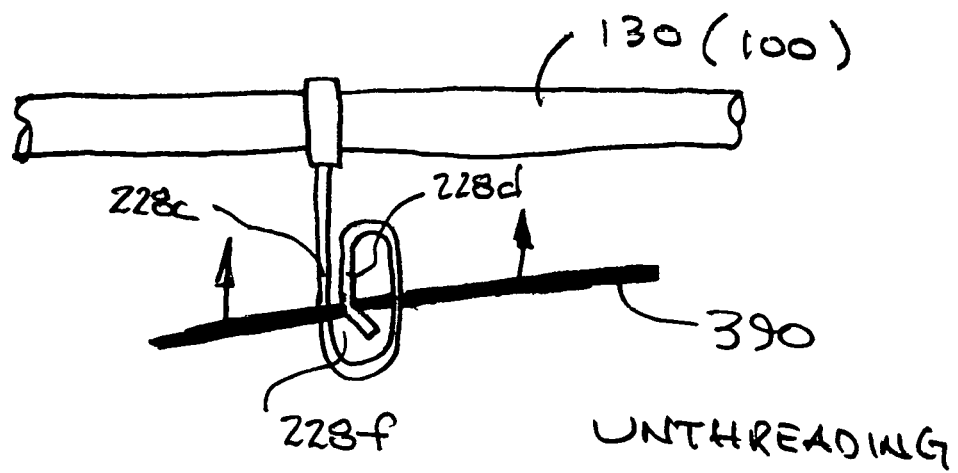

FIG. 11 is a view of the method of threading and unthreading a section of continuous loop of outrigger line through a radially threadable outrigger line guide Threading a length of outrigger line 390 into radially-threadable line guide 228 is accomplished by first locating line 390 between pole 100 (pole section 130 is part of pole 100) and line guide 228 (typical of several line guides), with line 390 against straight section 228c. Line 390 is then moved away from pole 100, and forced between straight sections 228c and 228d of the elongated loop part of line guide 228. At the completion of this step, line 390 will be passing through the inside of the elongated loop.

Unthreading a length of outrigger line 390 from line guide 228 is accomplished by locating line 390 into gap 228f, then moving line 390 toward pole 100, forcing it between straight sections 228c and 228d. After the completion of this step, line 390 will be free of line guide 228.

Threading and unthreading of all the line guides (218, 228, 238, and 248) is done using the same steps described above. The step of assembling continuous loop of outrigger line 390 to the line guides is done with the outrigger being more or less "in the boat," before the outrigger pole is placed in a pole holder.

Having the outrigger line guides being radially threadable is necessary to accommodate threading a continuous outrigger line loop 390. If the outrigger line guides were not radially or side threadable, it would be necessary to open outrigger line loop 390 in order to thread it through the outrigger line guides.

Figure 12:
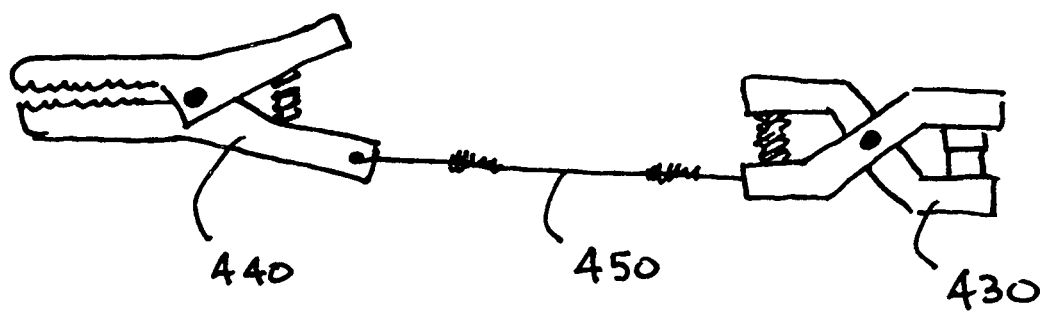
FIG. 12 is a view of a fishing line release adapted to attach to an outrigger line.

FIG. 12 is a view of a fishing line release adapted to attach to an outrigger line.

Fishing line release 420, shown in FIG. 6, is typically operated close to the small end of outrigger pole 100. The outrigger of the present invention is intended to be adapted to run more than one fishing line, with one, two, or three additional fishing lines being operated some distance from the small or far end of the outrigger pole, and some distance from each other.

Fishing line release 430 is attached to outrigger line clamp 440 with a length of multi-strand stainless steel wire 450. In the preferred embodiment, outrigger line clamp 440 is a stainless steel alligator clip, and fishing line release 430 is the same part as fishing line release 420. A kit for fishing with the present invention could include two or three of these fishing line release/outrigger line clamp assemblies (separate from the fishing line release that is part of the outrigger line loop), enabling the fisherman to deploy fishing lines in a range of configurations.

Figure 13:
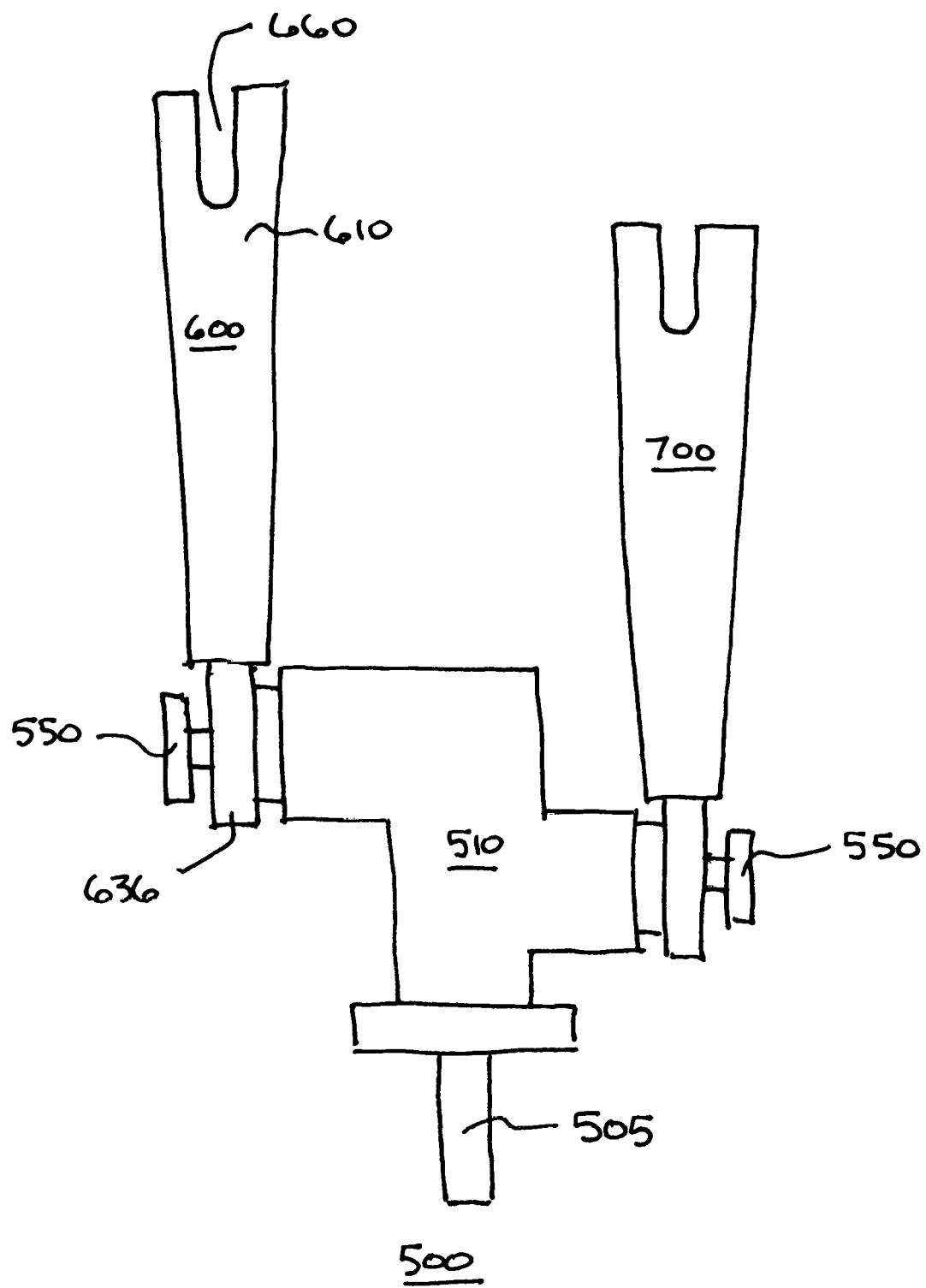
FIG. 13 is a front elevation view of a two-socket pole holder assembly.

FIG. 13 is a front elevation view of a two-socket pole holder assembly.

Two-socket pole holder assembly 500 is made of a body 510, and separate adjustable sockets 600 and 700. Body 500 has generally cylindrical shank portion 505 that has a diameter and length that is similar to common pole holders by manufactures such as Scotty.

Socket 600 has a hollow tapered cylindrical portion 610, and face-clamping portion 636. Tapered cylindrical portion 610 is open at the larger end, and closed at its opposite end. Tapered cylindrical portion 610 is adapted to hold either an outrigger pole or a fishing pole. The inside diameter is about 50 millimeters (2 inches), and the depth of the hollow socket is about 250 millimeters (10 inches).

To adapt to a fly fishing rod and reel, tapered cylindrical portion 610 has slots 660 at its open end. The fly rod can enter cylindrical portion 610 with fly reel standoff entering one of the slots 660. Slot 660 holds the fly rod and reel against rotating within adjustable socket 600.

In the preferred embodiment, slots 660 are about 25 millimeters (1 inch) wide and about 50 millimeters (2 inches) deep. Slots 660 are located 100 degrees apart, viewed from the end of adjustable socket 600.

Face clamping portion 636 has radial teeth and a through hole to facilitate mating with the radial teeth on face 536 of two-socket pole holder base 500. Clamping of adjustable socket 600 to base 500 is preferably accomplished with the use of a suitable length stainless steel carriage bolt and a handwheel 550 that includes a threaded nut. The general configuration and exact dimensions of the parts that perform the face-clamping can be varied in the practice of a two-socket pole holder.

The body 510 and sockets 600 and 700 of the two-socket pole holder assembly are preferably made from a moldable plastic. In the preferred embodiment, shank 505 contains an embedded steel reinforcing rod for strength.

Figure 14:
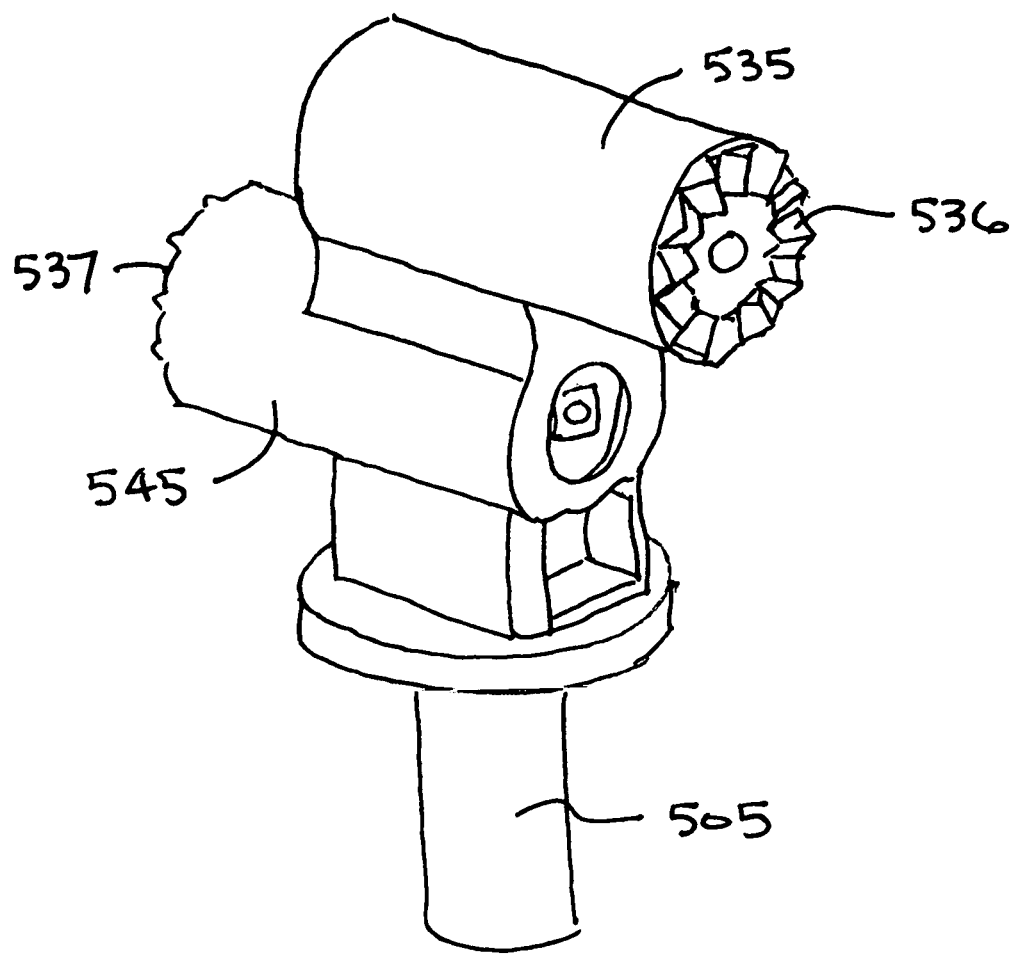
FIG. 14 is a perspective view of the body of a two-socket pole holder.

FIG. 14 is a perspective view of the body of a two-socket pole holder.

Body 510 has generally cylindrical base parts 535 and 545, with each base part having a through hole dicing its cylindrical axis and radial teeth on faces 536 and 537. The radial teeth on faces 536 and 537 of the body mate with corresponding radial teeth on parts of adjustable sockets 600 and 700. The through holes preferably have a square counterbore on the end opposite faces 536 and 537, adapted to standard carriage bolts.

Figure 15:
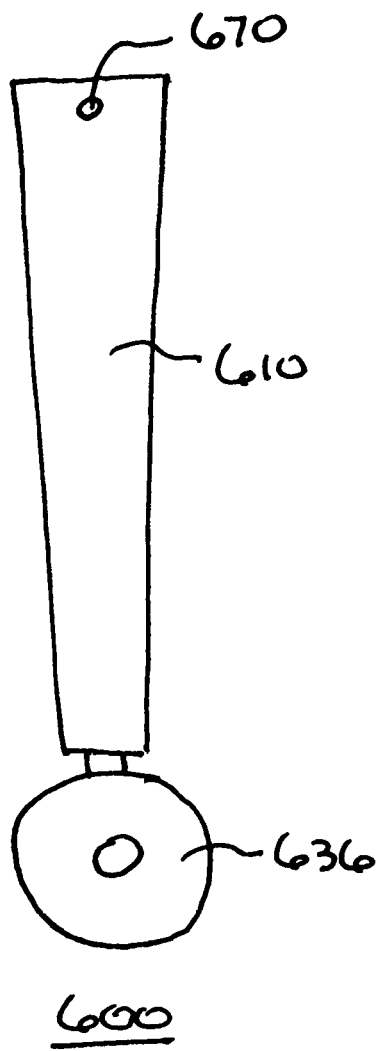
FIG. 15 is a side view of an adjustable socket used in the two-socket pole holder.

FIG. 15 is a side view of an adjustable socket used in the two-socket pole holder.

Holes 670 are provided to connect pulley assembly 340 to tapered cylindrical portion 610 of socket 600. In the preferred embodiment, the size and location (relative to the open end of tapered cylindrical portion 610) of holes 670 is selected to facilitate connection of pulley assembly 340, and in particular, to adapt to the "stainless steel micro S-biner" used to connect to the pulley with swivel. Holes 670 are located 180 degrees apart, viewed from the end of adjustable socket 600.

Socket 700 is preferably identical with socket 600. Having two opposing slots 660 and two opposing holes 670 in each socket eliminates any "right hand, left hand" preference that would exist if these parts had only one slot 660 and one hole 670.

Having sockets 600 and 700 independently clamped to body 500 of the two-socket pole holder allows the fisherman to independently adjust the angle of the socket holding the fishing pole or the socket holding the outrigger pole, without loosening the clamp of the other socket.

Figure 16:
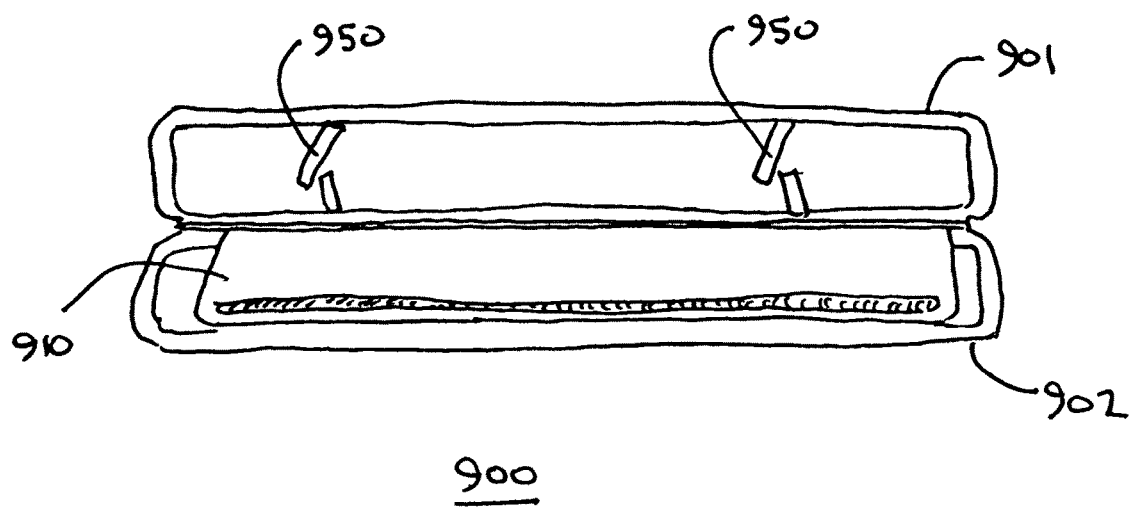
FIG. 16 is a view of the preferred storage and handling container for disassembled parts, in open condition.

FIG. 16 is a view of the preferred storage and handling container for disassembled parts, in open condition.

Figure 17:
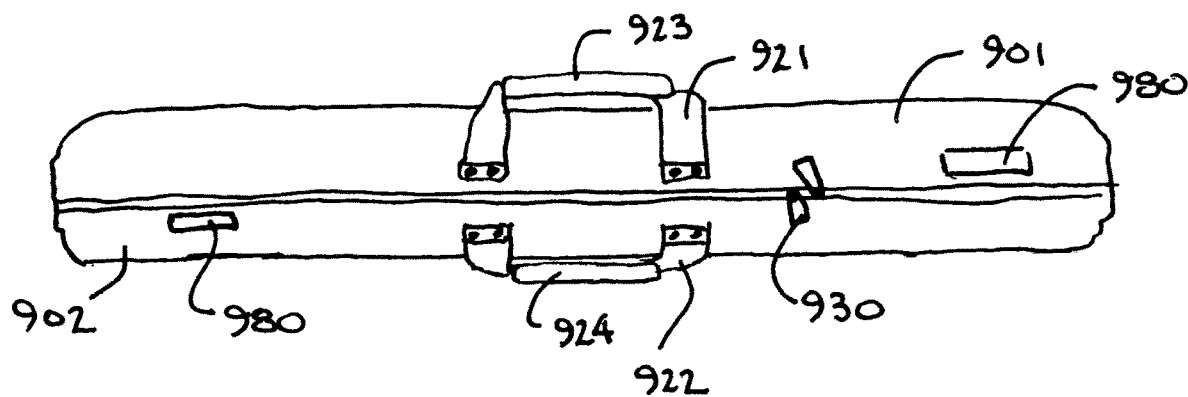
FIG. 17 is a view of the preferred storage and handling container for disassembled parts, in closed condition.

FIG. 17 is a view of the preferred storage and handling container for disassembled parts, in closed condition.

A kit for the present invention could include any portion of the parts described above, but must include at least a telescoping pole and separable line guides that are radially threadable. The assortment of parts can be gathered into any suitable bag or box.

The preferred form of the kit includes the following parts:
A telescoping pole
Two telescoping pole extensions
A set of four radially threadable line guides
Three differing length outrigger line loop assemblies. threaded through pulleys that can be quickly clipped to any convenient eye. Each outrigger line loop assembly also includes a fishing line release
Two additional fishing line releases with clips for attachment to an outrigger line
A pole holder that adapts a single pole holding receptacle on a fishing boat to hold both the assembled outrigger and a fishing pole. Adding an outrigger to the fishing experience does not require adding a pole holding receptacle to the fishing boat.
A carrying case that facilitates quick identification of the parts for a selected outrigger deployment, and makes it easy to keep the parts organized when they are stowed. The carrying case preferably has extra room, sufficient to hold a fishing pole and reel.

The collapsed telescoping pole that makes up the shortest intended deployed length is capped at both ends, to protect the pole segment ends, and also to prevent the pole segments from separating.

Additional telescoping pole segments, those that are used to create longer extended outrigger poles, are preferably also capped at both ends, primarily to protect the pole segments ends from damage, but also to prevent small parts from migrating into the pole segments. In the preferred embodiment, the first extension is made with two segments. The two segments that make up the first extension are nested for stowage.

Outrigger line loop assemblies are preferably stored in coiled or hanked arrangement, with a tie wrap or hook and loop wrap holding each outrigger line loop assembly, so that the several outrigger line assemblies won't tangle with each other. In the preferred embodiment, a plastic-coated metal wire is provided for this purpose. When the outrigger is deployed and being used for fishing, this plastic-coated metal wire can be used to restrain a fishing rod from being pulled out of its rod holder.

The preferred method of stowing an outrigger line loop assembly is to gather the two pulleys together, with line loop 390 being arranged so metal ring 395 is close to one of the two pulleys. The outrigger cord loop is thusly made into four approximately equal lengths, two lengths leaving each pulley. This collection of cordage is coiled, then tie wrapped. This stowage method results in minimal tangling of the outrigger cord loop.

Carrying case 900 is a rigid elongated box, split and hinged along the length so as to create two equal volume halves, 901 and 902. Carrying case 900 is held closed by a single zipper with two zipper sliders 930. In the preferred package, carrying case 900 includes attached zipper-close screen bag 910, which is used to store the outrigger line loop assemblies. Each line loop assembly uses braided cord of a different color, so the various lengths can be identified without unwrapping the loop.

In the preferred organization of parts in the carrying case, the telescoping pole segments are stowed in one of the two halves of the carrying case, and the rod holder parts are stowed in the other half. In the preferred sizing of carrying case 900, the length is 60 to 100 millimeters (several inches) longer than the length of the collapsed telescoping outrigger pole, the width is 25 to 50 millimeters (an inch or two) more than the width of this collapsed pole plus two extension segments laying side by side, and the depth of a case half (either 901 or 902) is 15 to 30 millimeters (about an inch) greater than the diameter of the largest diameter outrigger pole segment.

Each half of carrying case 900 also has two flat straps 950, which can be cinched closed with hook and loop fastening or with common strap hardware. These straps can be used to restrain the telescoping pole segments in one half of the carrying case, and the rod holder parts (especially the adjustable sockets) in the other half.

Smaller parts, such as the detachable radially-threadable line guides and the separate line release assemblies, are stowed in a string-close bag of suitable waterproof material, that is not attached to the carrying case in any way.

Carrying case 900 is preferable fitted with au attached fabric handle. This handle is two flat woven fabric straps 921 and 922, with one fabric strap being attached to each half of case 900. When the carrying case is closed, the two fabric strap parts can be gathered together. In the preferred embodiment, each fabric strap part additionally has an attached length of plastic grip 923 and 924, where the two pieces of plastic grip nest and snap together. When the two pieces of plastic grip are snapped together, fabric strap parts 921 and 922 are held in the gathered condition.

Carrying case 900 is preferably fitted with external loops or "D" rings 980 for attachment of an adjustable length carrying strap.

The present invention, described above, relates to a outrigger kit for fishing. Features of the present invention are recited in the appended claims. The drawings contained herein necessarily depict structural features and embodiments of the outrigger kit for fishing, useful in the practice of the present invention.

However, it will be appreciated by those skilled in the arts pertaining thereto, that the present invention can be practiced in various alternate forms, proportions, and configurations. Further, the previous detailed descriptions of the preferred embodiments of the present invention are presented for purposes of clarity of understanding only, and no unnecessary limitations should be implied therefrom. Finally, all appropriate mechanical and functional equivalents to the above, which may be obvious to those skilled in the arts pertaining thereto, are considered to be encompassed within the claims of the present invention.

What I claim is:

1. A method of fishing using an outrigger, comprising the steps of:
    providing a telescoping pole with a large end and a small end, having an eye at the small end;
    extending the telescoping pole;
    attaching two or more detachable outrigger line guides to the extended telescoping pole, where the line guides are radially threadable;
    providing an outrigger line loop assembly comprising a first pulley having a first snap clip, a second pulley having a second snap clip, and a continuous loop of cord running around both the first and second pulleys, where the continuous loop of cord has a going length and a returning length, where each the going length and the returning length are approximately the same as the extended length of the telescoping pole;
    attaching the first snap clip to the eye at the small end of the extended telescoping pole;
    threading a portion of the returning length of the continuous loop of cord through each radially threadable line guide;
    removing the returning length of the continuous loop of cord from each radially threadable line guide;
    detaching the outrigger line loop assembly from the telescoping pole;
    extending the length of the extended telescoping pole by adding a first additional telescoping pole section; and
    providing a second outrigger line loop assembly—where the continuous loop of cord has a going length and a returning length, where each the going length and returning length are approximately the same as the length of the extended telescoping pole including the first additional telescoping pole section.

* * * * *